US009185135B2

(12) United States Patent
Gupta et al.

(10) Patent No.: US 9,185,135 B2
(45) Date of Patent: Nov. 10, 2015

(54) LOCATION BASED ENFORCEMENT OF MOBILE POLICY

(71) Applicant: QUALCOMM Incorporated, San Diego, CA (US)

(72) Inventors: Rajarshi Gupta, Sunnyvale, CA (US); Saumitra Mohan Das, Santa Clara, CA (US); Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/886,393

(22) Filed: May 3, 2013

(65) Prior Publication Data

US 2014/0331272 A1    Nov. 6, 2014

(51) Int. Cl.
*H04L 29/06* (2006.01)
*H04W 12/08* (2009.01)
*H04W 4/02* (2009.01)
*H04W 4/04* (2009.01)

(52) U.S. Cl.
CPC ............... *H04L 63/20* (2013.01); *H04W 4/021* (2013.01); *H04W 12/08* (2013.01); *H04W 4/04* (2013.01)

(58) Field of Classification Search
None
See application file for complete search history.

(56) References Cited

U.S. PATENT DOCUMENTS

| 7,272,403 | B2 | 9/2007 | Creamer et al. |
| 7,933,611 | B2 * | 4/2011 | Bocking et al. ............ 455/456.4 |
| 8,254,957 | B2 | 8/2012 | Ferren et al. |
| 2005/0181808 | A1 | 8/2005 | Vaudreuil |
| 2011/0202269 | A1 | 8/2011 | Reventlow |
| 2013/0013932 | A1 | 1/2013 | Kong et al. |
| 2013/0035063 | A1 | 2/2013 | Fisk et al. |

FOREIGN PATENT DOCUMENTS

| EP | 1915012 A2 | 4/2008 |
| WO | 2006066230 A1 | 6/2006 |
| WO | 2013011512 A1 | 1/2013 |

OTHER PUBLICATIONS

Patwardhan A., et al., "Enforcing policies in Pervasive Environments," The First Annual International Conference on Mobile and Ubiquitous Systems: Networking and Services, 2004, pp. 299-308.
International Search Report and Written Opinion—PCT/US2014/035381—ISA/EPO—Aug. 27, 2014.
Schmidt A U ., et al., "Trust for Location-based Authorisation", Dec. 13, 2007, XP002728457, Retrieved from the Internet: URL:http://arxiv.org/pdf/0712.2231.pdf [retrieved on Aug. 13, 2014] the whole document.

(Continued)

*Primary Examiner* — David Le
*Assistant Examiner* — Devin Almeida
(74) *Attorney, Agent, or Firm* — Hunter Clark PLLC

(57) ABSTRACT

Disclosed are systems, apparatus, devices, methods, computer program products, computer media, and other implementations, including a method that includes communicating data representative of one or more location-based restrictions corresponding to a venue area to a mobile device determined to be located within the venue area, and controlling, by at least one venue server, use at the mobile device of services available at the venue area from one or more nodes associated with the venue area based, at least in part, on a determination, by the at least one venue server, of whether the mobile device complies with the location-based restrictions corresponding to the venue area.

68 Claims, 6 Drawing Sheets

(56) References Cited

OTHER PUBLICATIONS

Second Written Opinion from International Application No. PCT/US2014/035381, dated Apr. 20, 2015, 9 pp.

International Preliminary Report on Patentability—PCT/US2014/035381, European Patent Office—Munich, Germany, Jul. 17, 2015, 40 pgs.

* cited by examiner

LOCATION BASED ENFORCEMENT OF MOBILE POLICY

BACKGROUND

Some mobile devices, such as mobile phones, include various sensors, input modules/devices, and communication modules, that are configured to obtain data available in the devices vicinity. For example, mobile devices equipped with WLAN transceivers (e.g., WiFi-based transceivers, Bluetooth-based transceivers) may establish communications links with nearby access points and/or servers, and access data available at, or through, such access points and servers. In another example, mobile devices equipped with a camera device and/or an audio recording device may be able to record visual and/or audio data.

In certain areas, unregulated use of sensor/input/communication modules/devices, whether housed on a mobile device or otherwise, may constitute a security-risk. For example, situations of frequent camera use in a security-sensitive area, such as a government building, a hospital, a bank, etc., may be deemed to pose a security risk, as does an unfettered ability to access data via a device's communication module (e.g., a WiFi transceiver/interface of the mobile device, a cellular transceiver for communicating with a WWAN network, etc.). Various ways to mitigate potential security problems associated with the presence of these types of mobile devices in security sensitive areas include completely disabling those devices (e.g., taping the mobile device's camera shut, or powering down the device), temporary confiscating a mobile device when its user enters a security-sensitive area, and other such onerous measures.

However, in some situations, users entering such security sensitive area may need their mobile devices to, for example, take notes during a meeting, access needed data stored on their devices, etc.

SUMMARY

Thus, in some variations, a method is disclosed. The method includes communicating data representative of one or more location-based restrictions corresponding to a venue area to a mobile device determined to be located within the venue area, and controlling, by at least one venue server, use at the mobile device of services available at the venue area from one or more nodes associated with the venue area based, at least in part, on a determination, by the at least one venue server, of whether the mobile device complies with the location-based restrictions corresponding to the venue area.

Embodiments of the method may include at least some of the features described in the present disclosure, including one or more of the following features.

Communicating the data representative of the one or more location-based restrictions may include transmitting to a trusted-engine executing on the mobile device the data representative of the one or more location-based restrictions corresponding to the venue area in which the mobile device is determined to be located, wherein the trusted engine is configured to negotiate and to enforce, at least in part, the one or more location-based restrictions corresponding to the venue area.

The trusted engine may further be configured to determine, at least in part, whether the mobile device complies with the location-based restrictions corresponding to the venue area.

Communicating the data representative of the one or more location-based restrictions may include communicating data representative of use-policy within the venue area in which the mobile device is determined to be located. The use policy may include one or more of, for example, requirements regarding physical entry into restricted regions in the venue area, and/or requirements regarding access of restricted content data. The restricted content data may include at least some of data residing at the one or more nodes associated with the venue area.

Controlling, by the at least one venue server, the use at the mobile device of the services available at the venue area may include enabling, by the at least one venue server, the use at the mobile device of the services available at the venue area from the one more nodes associated with the venue area when the mobile device is determined, by the at least one venue server, to comply with the one or more location-based restrictions corresponding to the venue area.

Controlling, by the at least one venue server, the use at the mobile device of the services available at the venue area may include initiating one or more enforcement operations in response to a determination that one or more violations by the mobile device of the location-based restrictions have occurred.

The one or more enforcement operations may include one or more of, for example, causing suspension or termination of at least one communication link between at least one of the one or more nodes associated with the venue area and the mobile device, causing restricted content destined to the mobile device to be discarded before it is transmitted to the mobile device, and/or or sending a warning message to the mobile device that a violation has occurred.

The services available at the venue area may include one or more of, for example, communication services, and/or data services.

The method may further include determining, by the at least one venue server, location of the mobile device.

Determining the location of the mobile device may include determining one or more of, for example, a global geographical position coordinates corresponding to the location of the mobile device, a location context identifier for the mobile device, and/or another identifier associated with the location of the mobile device.

Communicating data representative of the one or more location-based restrictions corresponding to the venue area to the mobile device may include communicating data representative of the one or more location-based restrictions corresponding to the venue area to the mobile device determined, by the mobile device, to be located within the venue area.

In some variations, a server is disclosed. The server includes one or more processors, and storage media comprising computer instructions. The computer instructions, when executed on the one or more processors, cause operations including communicating data representative of one or more location-based restrictions corresponding to a venue area to a mobile device determined to be located within the venue area, and controlling, by the server, use at the mobile device of services available at the venue area from one or more nodes associated with the venue area based, at least in part, on a determination, by the server, of whether the mobile device complies with the location-based restrictions corresponding to the venue area.

Embodiments of the server may include at least some of the features described in the present disclosure, including at least some of the features described above in relation to the method.

In some variations, an apparatus is disclosed. The apparatus includes means for communicating data representative of one or more location-based restrictions corresponding to a venue area to a mobile device determined to be located within the venue area, and means for controlling use at the mobile device of services available at the venue area from one or more nodes associated with the venue area based, at least in part, on a determination of whether the mobile device complies with the location-based restrictions corresponding to the venue area.

Embodiments of the apparatus may include at least some of the features described in the present disclosure, including at least some of the features described above in relation to the method and the server, as well as one or more of the following features.

The means for communicating the data representative of the one or more location-based restrictions may include means for transmitting to a trusted-engine executing on the mobile device the data representative of the one or more location-based restrictions corresponding to the venue area in which the mobile device is determined to be located, wherein the trusted engine is configured to negotiate and to enforce, at least in part, the one or more location-based restrictions corresponding to the venue area.

The means for communicating the data representative of the one or more location-based restrictions may include means for communicating data representative of use-policy within the venue area in which the mobile device is determined to be located. The use policy may include one or more of, for example, requirements regarding physical entry into restricted regions in the venue area, and/or requirements regarding access of restricted content data.

The means for controlling the use at the mobile device of the services available at the venue area may include means for enabling the use at the mobile device of the services available at the venue area from the one more nodes associated with the venue area when the mobile device is determined to comply with the one or more location-based restrictions corresponding to the venue area.

The means for controlling the use at the mobile device of the services available at the venue area may include means for initiating one or more enforcement operations in response to a determination that one or more violations by the mobile device of the location-based restrictions have occurred.

The apparatus may further include means for determining location of the mobile device, including determining one or more of, for example, a global geographical position coordinates corresponding to the location of the mobile device, a location context identifier for the mobile device, and/or another identifier associated with the location of the mobile device.

The means for communicating data representative of the one or more location-based restrictions corresponding to the venue area to the mobile device may include means for communicating data representative of the one or more location-based restrictions corresponding to the venue area to the mobile device determined, by the mobile device, to be located within the venue area.

In some variations, a processor readable media programmed with a set of instructions executable on a processor is disclosed. The set of instructions, when executed, cause operations including communicating data representative of one or more location-based restrictions corresponding to a venue area to a mobile device determined to be located within the venue area, and controlling, by at least one venue server, use at the mobile device of services available at the venue area from one or more nodes associated with the venue area based, at least in part, on a determination, by the at least one venue server, of whether the mobile device complies with the location-based restrictions corresponding to the venue area.

Embodiments of the processor-readable media may include at least some of the features described in the present disclosure, including at least some of the features described above in relation to the method, the server, and the apparatus.

In some variations, an additional method is disclosed. The additional method includes obtaining, by a mobile device, data representative of one or more location-based restrictions corresponding to a venue area in which the mobile device is determined to be located, and obtaining, at the mobile device, services available at the venue area from one or more nodes associated with the venue area based, at least in part, on a determination, by a venue server associated with the venue area, of whether the mobile device complies with the location-based restrictions corresponding to the venue area.

Embodiments of the additional method may include at least some of the features described in the present disclosure, including at least some of the features described above in relation to the first method, the server, the apparatus, and the processor-readable media, as well as one or more of the following features.

Obtaining the data representative of the one or more location-based restrictions may include receiving by a trusted-engine executing on the mobile device the data representative of the one or more location-based restrictions corresponding to the venue area in which the mobile device is determined to be located. The trusted engine may be configured to negotiate and to enforce, at least in part, the one or more location-based restrictions corresponding to the venue area. The trusted engine may further be configured to determine, at least in part, whether the mobile device complies with the location-based restrictions corresponding to the venue area.

Obtaining the data representative of the one or more location-based restrictions may include obtaining use policy comprising one or more of, for example, requirements regarding physical entry into restricted regions in the venue area, and/or requirements regarding access of restricted content data.

Obtaining, at the mobile device, services available at the venue area from the one or more nodes associated the venue area may include obtaining degraded services, caused through initiation of one or more enforcement operations by the venue server to modify the services available from the one or more nodes, in response to a determination that one or more violations by the mobile device of the location-based restrictions have occurred.

In some variations, a mobile device disclosed. The mobile device includes one or more processors, and storage media comprising computer instructions that, when executed on the one or more processors, cause operations that include obtaining data representative of one or more location-based restrictions corresponding to a venue area in which the mobile device is determined to be located, and obtaining, at the mobile device, services available at the venue area from one or more nodes associated with the venue area based, at least in part, on a determination, by a venue server associated with the venue area, of whether the mobile device complies with the location-based restrictions corresponding to the venue area.

Embodiments of the mobile device may include at least some of the features described in the present disclosure, including at least some of the features described above in relation to the methods, the server, the apparatus, and the processor-readable media.

In some variations, an additional apparatus is disclosed. The apparatus includes means for obtaining data representative of one or more location-based restrictions corresponding to a venue area in which a mobile device is determined to be located, and means for obtaining services available at the venue area from one or more nodes associated with the venue area based, at least in part, on a determination, by a venue server associated with the venue area, of whether the mobile device complies with the location-based restrictions corresponding to the venue area.

Embodiments of the additional apparatus may include at least some of the features described in the present disclosure, including at least some of the features described above in relation to the methods, the server, the mobile device, the first apparatus, and the processor-readable media, as well as one or more of the following features.

The means for obtaining the data representative of the one or more location-based restrictions may include means for receiving by a trusted-engine executing on the mobile device the data representative of the one or more location-based restrictions corresponding to the venue area in which the mobile device is determined to be located. The trusted engine may be configured to negotiate and to enforce, at least in part, the one or more location-based restrictions corresponding to the venue area.

The means for obtaining the data representative of the one or more location-based restrictions may include means for obtaining use policy comprising one or more of, for example, requirements regarding physical entry into restricted regions in the venue area, and/or requirements regarding access of restricted content data.

The means for obtaining services available at the venue area from the one or more nodes associated the venue area may include means for obtaining degraded services, caused through initiation of one or more enforcement operations by the venue server to modify the services available from the one or more nodes, in response to a determination that one or more violations by the mobile device of the location-based restrictions have occurred.

In some variations, additional processor readable media programmed with a set of instructions executable on a processor is disclosed. The set of instructions, when executed, cause operations including obtaining, by a mobile device, data representative of one or more location-based restrictions corresponding to a venue area in which the mobile device is determined to be located, and obtaining, at the mobile device, services available at the venue area from one or more nodes associated with the venue area based, at least in part, on a determination, by a venue server associated with the venue area, of whether the mobile device complies with the location-based restrictions corresponding to the venue area.

Embodiments of the additional processor readable media may include at least some of the features described in the present disclosure, including at least some of the features described above in relation to the methods, the server, the mobile device, the apparatus, and the first processor-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" (or "one or more of A, B, or C") may also include A, AA, AAB, AAA, BB, BCC, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Other and further objects, features, aspects, and advantages of the present disclosure will become better understood with the following detailed description of the accompanying drawings.

BRIEF DESCRIPTION OF THE DRAWING

Like reference symbols in the various drawings indicate like elements.

DESCRIPTION

Figure 1:
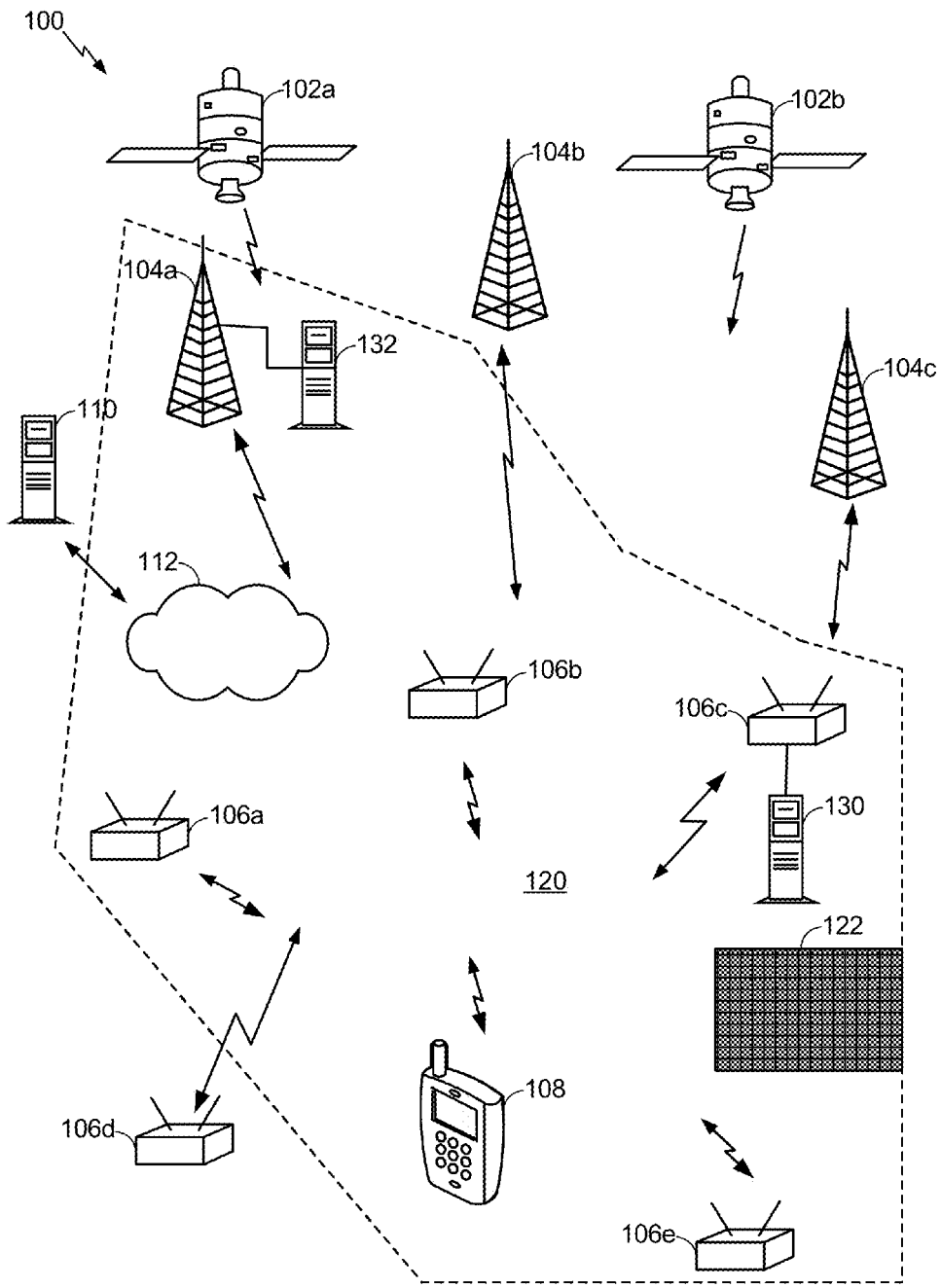
FIG. 1 is a schematic diagram of an example operating environment in which a mobile device may operate.

In some embodiments, limited device functionality, in accordance with location-based use restrictions unique to a particular location where a device is being used, may be enabled and implemented. For example, users may still be able to use their devices (without having to manually take any measures, such as taping shut devices' camera, to satisfy security concerns), while the devices' functionality may be controlled based on location-based restrictions corresponding to the location where the devices are determined to be at. In some embodiments, various devices may be equipped with a secure behavior engine, and only devices with that type of a behavior engine may then be allowed within the area in which these location-based restrictions are imposed/enforced. For instance, such devices may be provided to employees and principals of an enterprise in which security-based restrictions are required. In some embodiments, enforcement of location-based restrictions is achieved through quid-pro-quo arrangements, in which a venue server can control/regulate the services provided to a mobile device from one or more nodes so as to provide continued service to the device in exchange for the device adhering to the location-based restriction. The venue server can impose restrictions on the service provided (e.g., suspend or terminate communications links between the serving nodes and the device) in response to a determination that the device is violating one or more of the venue area's restrictions.

Thus, disclosed herein are methods, devices, systems, apparatus, products, media, and other implementations, including a method that includes communicating data representative of one or more location-based restrictions (e.g., use policies) corresponding to a venue area to a mobile device determined to be located within the venue area (or, in some embodiments, the data representative of the restrictions are communicated to a device that may, in the future, enter an area corresponding to the venue area), and controlling, by at least one venue server, use at the mobile device of services available at the venue area from one or more nodes associated with the venue area based, at least in part, on a determination, by the at least one venue server, of whether the mobile device complies with the location-based restrictions corresponding to the venue area. In some embodiments, the location-based restrictions include use policies such as, for example, requirements regarding physically entering, by the device, restricted regions in the venue area, requirements regarding accessing restricted content data, etc. In some embodiments, controlling the use at the mobile device of the services available at the venue area may include initiating one or more enforcement operations in response to a determination that one or more violations by the mobile device of the location-based restrictions have occurred. Such one or more enforcement operations may include, for example, causing suspension or termination of at least one communication link between at least one of the nodes associated with the venue area and the device, causing restricted content destined to the device to be discarded before it is transmitted to the device, and/or sending a warning to the device that a violation has occurred.

With reference to FIG. 1, shown is a schematic diagram of an example environment 100 in which a mobile device 108, whose use of services available at venue area is to be controlled, operates. The environment 100 may include one or more venue areas, such as the venue area 120, that may each be associated with a corresponding set of restrictions expressing a use policy that is enforced for mobile devices within the corresponding venue area. Such restrictions may include restrictions about using certain features of a mobile device (e.g., restrictions about using WWAN cellular communication within the venue area, restrictions about using the device's camera, etc.), restrictions about accessing certain type of content data, restrictions about entering designated area within the venue area (e.g., area 122 in FIG. 1 corresponds to an area with the venue area 120 that only authorized personnel may enter), etc.

The mobile device (also referred to as a wireless device or as a mobile station) 108 may be configured, in some embodiments, to operate and interact with multiple types of other communication systems/devices, including local area network devices (or nodes), such as WLAN for indoor communication, femtocells, Bluetooth-based transceivers, and other types of indoor communication network nodes, wide area wireless network nodes, satellite communication systems, etc., and as such the mobile device 108 may include one or more interfaces to communicate with the various types of communications systems. As used herein, communication systems/devices/nodes with which the mobile device 108 may communicate are also referred to as access points (AP's). One or more of the nodes associated with the venue area 100 may be servers configured to provide services to devices, such as the device 108, that are in communication with them. Such services include communication services (e.g., enabling the device to communicate with remote nodes that are within or outside the venue area 100), data services, etc. As will be discussed in greater detail below, in some embodiments the mobile device may continue to have access to certain services that are available through one or more servers associated with the venue area where the device is located in response to a determination by a venue server (which may be one of the servers providing services to the mobile device) that the mobile device is complying with location-based restrictions corresponding to the particular venue area. In some embodiments, such services may also be provided in response to an additional determination that the mobile device is located within the venue area 100. In some embodiments, enforcement of the location-based restrictions being imposed may be at least partly achieved through a policy enforcement engine (also referred to a behavioral engine) installed/housed on the mobile device. Such an engine may be configured to control/regulate some of the functionality of the device in accordance with the location-based restrictions. For example, in situations where the mobile device is located in a public secure area (e.g., a government building) where use of an onboard camera is not permitted, the behavioral engine may cause the camera functionality of the mobile device to be disabled.

The venue area 100 may contain one or more different types of wireless communication systems or nodes. Such nodes, also referred to as wireless access points (or WAPs), may include LAN and/or WAN wireless transceivers, including, for example, WiFi base stations, femto cell transceivers, Bluetooth transceivers, cellular base stations, WiMax transceivers, etc. Thus, for example, and with continued reference to FIG. 1, the venue area 100 may include Local Area Network Wireless Access Points (LAN-WAPs) 106a-e that may be used for wireless voice and/or data communication with the mobile device 108. The LAN-WAPs 106a-e may also be utilized as independents sources of position data, e.g., through implementation of multilateration-based procedures using, for example, on time of arrival techniques. The LAN-WAPs 106a-e may also be configured to detect the presence of the mobile device, e.g., detect signals transmitted from the device 108, such as control signals communicated from the mobile device (e.g., to request establishment of communication channels/links with one or more of the communication nodes that are within communication range of the device 108), and/or to determine position of the mobile device (approximate or exact) based on signals transmitted by the mobile device and received by one or more of the access points 106a-e and/or access points 104a-c. The LAN-WAPs 106a-e can be part of a Wireless Local Area Network (WLAN), which may operate in buildings and perform communications over smaller geographic regions than a WWAN. Additionally in some embodiments, the LAN-WAPs 106a-e could also be pico or femto cells. As illustrated in FIG. 1, the venue area 120 includes, in this example, the WLAN nodes 106a-c and 106e.

In some embodiments, the LAN-WAPs 106a-e may be part of, for example, WiFi networks (802.11x), cellular piconets and/or femtocells, Bluetooth Networks, etc. The LAN-WAPs 106a-e can also include a Qualcomm indoor positioning system (QUIPS). A QUIPS implementation may, in some embodiments, be configured so that a mobile device can communicate with a server that provides the device with data (such as to provide the assistance data, e.g., maps, RF heatmaps, connectivity information, etc.) for a particular floor or some other region where the mobile device is located. Although five (5) LAN-WAP access points are depicted in FIG. 1, any number of such LAN-WAP's may be used, and, in some embodiments, the environment 100 may include no LAN-WAPs access points at all, or may include a single LAN-WAP access point. Furthermore, each of the LAN-WAPs 106*a-e* depicted in FIG. 1 may be a moveable node, or may be otherwise capable of being relocated. Additionally, the nodes may be associated with the venue area 120 in that the venue server may be configured to control their operations in the course of enforcing the venue area's restrictions on the mobile device 108. However, the actual presence of a node within the venue area 120 does not necessarily imply that such a node is associated with the venue area. For example, any one of the depicted nodes may be unrelated to the venue area 120. Similarly, while the node 106*d* is shown as being located outside the venue area 120, the node's physical location does not determine whether the node is or is not associated with the venue area 120.

Also shown in FIG. 1 is a server 130 coupled to the node/access point 106*c*. As will be described in greater details below, the server 130 may be a venue server that communicates, in some embodiments, the venue area's location-based restrictions, monitors compliance of devices in the venue area with the restrictions, and/or initiate enforcement operations. Although the server 130 is illustrated as being coupled to an access point configured to wirelessly communicate with devices (such as the device 108), it will be appreciated that the server 130 may include its own transceiver device(s) to directly communicate with the device 108 (and other devices). It will also be appreciated that any one of the nodes/access points 106*a-e* may include server-like and controller functionality. In some embodiments, the server 130 or 132 could be connected across a wide area network (cloud) and be located in different physical spaces.

As further shown in FIG. 1, the environment 100 may also include a plurality of one or more types of Wide Area Network Wireless Access Points (WAN-WAPs) 104*a-c*, which may be used for wireless voice and/or data communication, and may also serve as another source of independent information through which the mobile device 108 may determine its position/location. The WAN-WAPs 104*a-c* may be part of wide area wireless network (WWAN), which may include cellular base stations, and/or other wide area wireless systems, such as, for example, HSPA, LTE or WiMAX (e.g., 802.16). A WWAN may include other known network components which are not shown in FIG. 1. Typically, each WAN-WAPs 104*a*-104*c* within the WWAN may operate from fixed positions, and provide network coverage over large metropolitan and/or regional areas. The WAN-WAPs 104-104*c* may include, for example, femto cell transceivers, Bluetooth transceivers, cellular base stations (e.g., cellular towers), WiMax transceivers, etc. Although three (3) WAN-WAPs are depicted in FIG. 1, any number of such WAN-WAPs may be used. In some embodiments, the environment 100 may include no WAN-WAPs at all, or may include a single WAN-WAP. Additionally, each of the WAN-WAPs 104*a-c* depicted in FIG. 1 may be a moveable node, or may otherwise be capable of being relocated.

Similar to the access points 106*a-e*, one or more of the access points 104*a-c* may be configured to facilitate detecting the presence of the mobile device 108 in the vicinity of the such one or more access points, and/or facilitate determining the position (approximate of exact) of the mobile device 108 and/or other devices. Additionally, one or more of the access points 104*a-c* may be configured to facilitate controlling use of the mobile device based on compliance of the mobile device with location-based restrictions associated with the venue area 100 with which the access points 104*a-c* and/or 106*a-e* are associated. For example, one or more of the nodes/access points 104*a-c* may be designated as a venue server (in addition to, or instead of use of one or more of the access points 106*a-e* as a venue server). In the example of FIG. 1, a server 132 is shown coupled to the access point 104*a*. The server 132, in conjunction with the access point 104*a*, may be configured, in some embodiments, to act as a venue server (e.g., to control operations of other nodes in relation to services provided to visiting devices, monitor compliance of visiting devices with the venue area's location-based restrictions, etc.), provide services to visiting devices, etc. The access point(s) designated as the venue server may communicate to the mobile device the location-based restrictions (e.g., use-policy) associated with the venue area 100 (e.g., communicate the location-based restrictions in response to a determination that the mobile device has entered and is located within the venue area 100), and thereafter monitor the behavior of the mobile device to determine compliance of the mobile device 108 with the use policies. While the mobile device continues to comply with the use policy of the venue area, the various servers/access points associated with the venue server may continue to provide services to the mobile device 108.

Communication to and from the mobile device 108 (to exchange data, provide services, enable position determination of the device 108, etc.) may thus also be implemented, in some embodiments, using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be implemented, at least in part, using an IEEE 802.11x network, and a WPAN may be a Bluetooth network, an IEEE 802.15x, or some other type of network. The techniques described herein may also be used for any combination of WWAN, WLAN and/or WPAN.

When deriving position using the access points 104*a-b* and/or 106*a-e*, the mobile device 108 may utilize, for example, time of arrival techniques, optionally with the assistance of a positioning server 110 and a network 112 which may be part of local network (and local positioning server) associated with a local venue area that implements and enforces location-based restrictions of the venue area. Thus, in such embodiments, the server(s) of the venue area in which the mobile device is located may be configured to detect the presence of the mobile device and/or determine its exact or approximate location. The positioning server (also referred to as a location manager) 110 may communicate with the mobile device 108 through the network 112.

In some embodiments, and as further depicted in FIG. 1, the mobile device 108 may also be configured to at least receive information from satellites of a Satellite Positioning System (SPS) 102*a-b*, which may be used as an independent source of position information for the mobile device 108. The mobile device 108 may thus include one or more dedicated SPS receivers specifically designed to receive signals for deriving geo-location information from the SPS satellites. Thus, in some embodiments, the mobile device 108 may communicate with any one or a combination of the SPS satellites 102*a-b*, the WAN-WAPs 104*a-c*, and/or the LAN-WAPs 106*a-e*. In some embodiments, each of the aforementioned systems can provide an independent information estimate of the position for the mobile device 108 using different techniques. In some embodiments, the mobile device may combine the solutions derived from each of the different types of access points to improve the accuracy of the position data.

In embodiments in which the mobile device 108 can receive satellite signals, the mobile device may utilize a receiver (e.g., a GNSS receiver) implemented for use with the SPS to extract position data from a plurality of signals transmitted by the SPS satellites 102*a-b*. Transmitted satellite signals may include, for example, signals marked with a repeating pseudo-random noise (PN) code of a set number of chips and may be located on ground based control stations, user equipment and/or space vehicles. Satellite positioning systems may include such systems as the Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like.

In some embodiments, the techniques/procedures presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

As used herein, a mobile device or station (MS) refers to a device such as a cellular or other wireless communication device, personal communication system (PCS) device, personal navigation device (PND), Personal Information Manager (PIM), Personal Digital Assistant (PDA), a tablet device, a laptop or some other suitable mobile device which may be capable of receiving wireless/cellular communication and/or navigation signals, such as navigation positioning signals. The term "mobile station" (or "wireless device") is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, "mobile station" is intended to include all devices, including wireless communication devices, computers, laptops, tablet, etc., which are capable of communication with a server, such as via the Internet, WiFi, or other network, regardless of whether satellite signal reception, assistance data reception, and/or position-related processing and/or other functions and operations, occurs at the device, at a server, or at another device associated with the network. Any operable combinations of the above are also considered a "mobile station."

Figure 2:
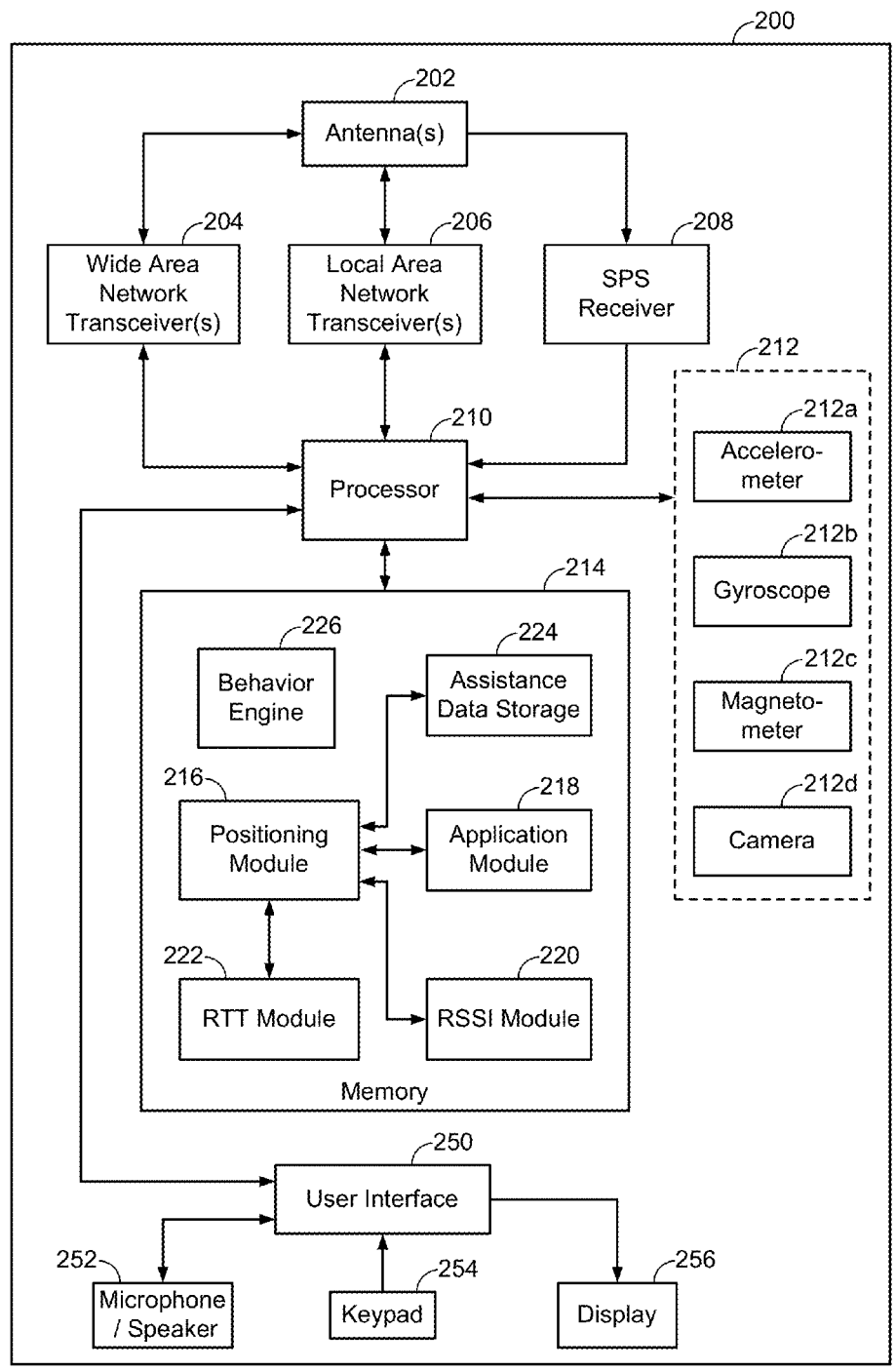
FIG. 2 is a schematic diagram of an example mobile device.

With reference now to FIG. 2, a schematic diagram illustrating various components of an example mobile device 200, which may be similar to the mobile device 108 of FIG. 1, is shown. For the sake of simplicity, the various features/components/functions illustrated in the box diagram of FIG. 2 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 2 may be further subdivided, or two or more of the features or functions illustrated in FIG. 2 may be combined. Additionally, one or more of the features or functions illustrated in FIG. 2 may be excluded.

As shown, the mobile device 200 may include one or more local area network transceivers 206 that may be connected to one or more antennas 202. The one or more local area network transceivers 206 comprise suitable devices, hardware, and/or software for communicating with and/or detecting signals to/from one or more of the LAN-WAPs 106*a-e* depicted in FIG. 1, and/or directly with other wireless devices within a network. In some embodiments, the local area network transceiver(s) 206 may comprise a WiFi (802.11x) communication transceiver suitable for communicating with one or more wireless access points; however, in some embodiments, the local area network transceiver(s) 206 may be configured to communicate with other types of local area networks, personal area networks (e.g., Bluetooth), etc. Additionally, any other type of wireless networking technologies may be used, for example, Ultra Wide Band, ZigBee, wireless USB, etc.

The mobile device 200 may also include, in some implementations, one or more wide area network transceiver(s) 204 that may be connected to the one or more antennas 202. The wide area network transceiver 204 may comprise suitable devices, hardware, and/or software for communicating with and/or detecting signals from one or more of, for example, the WAN-WAPs 104*a-c* illustrated in FIG. 1, and/or directly with other wireless devices within a network. In some implementations, the wide area network transceiver(s) 204 may comprise a CDMA communication system suitable for communicating with a CDMA network of wireless base stations. In some implementations, the wireless communication system may comprise other types of cellular networks, such as, for example, TDMA, GSM, etc. Additionally, any other type of wireless networking technologies may be used, including, for example, WiMax (802.16), etc.

In some embodiments, an SPS receiver (also referred to as a global navigation satellite system (GNSS) receiver) 208 may also be included with the mobile device 200. The SPS receiver 208 may be connected to the one or more antennas 202 for receiving satellite signals. The SPS receiver 208 may comprise any suitable hardware and/or software for receiving and processing SPS signals. The SPS receiver 208 may request information as appropriate from the other systems, and may perform the computations necessary to determine the position of the mobile device 200 using, in part, measurements obtained by any suitable SPS procedure.

In some embodiments, the mobile device 200 may also include one or more sensors 212 coupled to a processor 210 (also referred to as a controller). For example, the sensors 212 may include motion sensors (also referred to as inertial sensors) to provide relative movement and/or orientation information which is independent of motion data derived from signals received by the wide area network transceiver(s) 204, the local area network transceiver(s) 206, and/or the SPS receiver 208. By way of example but not limitation, the motion sensors may include an accelerometer 212a, a gyroscope 212b, a geomagnetic (magnetometer) sensor 212c (e.g., a compass), an altimeter (e.g., a barometric pressure altimeter; not shown), and/or other sensor types. In some embodiments, the accelerometer 212a may be implemented based on micro-electro-mechanical-system (MEMS). Other types of accelerometers may be used in place of, or in addition to MEMS-based accelerometer. Additionally, a 3D accelerometer, comprising three perpendicularly placed accelerometers, may be implemented. In some embodiments, the gyroscope 212b may include a gyroscope based on MEMS technology, and may be a single-axis gyroscope, a double-axis gyroscope, or a 3-D gyroscope configured to sense motion about, for example, three orthogonal axes. Other types of gyroscopes may be used in place of, or in addition to MEMS-based gyroscope. In some embodiments, a magnetometer, configured to measure a magnetic field intensity and/or direction (and, thus, may be configured to measure absolute orientation with respect to the magnetic north) may also be implemented based, for example, on MEMS technology. Such MEMS-base magnetometers may be configured to detect motion caused by the Lorentz force produced by a current through a MEMS conductor. Other types of magnetometers may also be used. An altimeter may, for example, be configured to provide altitude data and thus may facilitate determining a floor in an indoor structure (e.g., an office building, a shopping mall, etc.) where the device may be located.

The output of the one or more sensors 212 may be combined in order to provide motion information. For example, estimated position of the mobile device 200 may be determined based on a previously determined position and distance traveled from that previously determined position as determined from the motion information derived from measurements by at least one of the one or more sensors. In some embodiments, the estimated position of the mobile device may be determined based on probabilistic models (e.g., implemented through a particle filter realized using the mobile device 200) using the outputs of the one or more sensors 212. As further shown in FIG. 2, in some embodiments, the one or more sensors 212 may also include a camera 212d (e.g., a charge-couple device (CCD)-type camera), which may produce still or moving images (e.g., a video sequence) that may be displayed on a user interface device, such as a display or a screen. Image data may also be used, in some embodiments, for navigation and location determination operations.

The processor(s) (also referred to as a controller) 210 may be connected to the local area network transceiver(s) 206, the wide area network transceiver(s) 204, the SPS receiver 208, and/or the one or more sensors 212. The processor may include one or more microprocessors, microcontrollers, and/or digital signal processors that provide processing functions, as well as other computation and control functionality. The processor 210 may also include storage media (e.g., memory) 214 for storing data and software instructions for executing programmed functionality within the mobile device. The memory 214 may be on-board the processor 210 (e.g., within the same IC package), and/or the memory may be external memory to the processor. Further details regarding an example embodiment of a processor or computation system, which may be similar to the processor 210, are provided below in relation to FIG. 6.

A number of software modules and data tables may reside in memory 214 and be utilized by the processor 210 in order to manage both communications with remote devices/nodes (such as the various access points depicted in FIG. 1), positioning determination functionality, and/or device control functionality. As will be described in greater details below, the processor 210 may also be configured, e.g., using software-based implementations, to obtain location-based restrictions (e.g., use policy) from a venue server(s) associated with the venue area in which the device 200 is determined to be located. In some embodiments, the device 200 may be configured to facilitate control (e.g., through a behavioral engine) of its operation in accordance with the location-based restrictions it received from the venue server. In some embodiments, monitoring the operation of the mobile device 200 to determine whether it is complying with the location-based restrictions may be performed (at least in part) by a remote device (such as the venue server), in which case the device 200 may be configured (e.g., through the processor 210) to cause data representative of the device's behavior and activities (e.g., the device's location) to be communicated to the venue server.

As illustrated in FIG. 2, memory 214 may include a positioning module 216, an application module 218, a received signal strength indicator (RSSI) module 220, a round trip time (RTT) module 222, a behavior engine 226, and/or an assistance data storage module 224. It is to be noted that the functionality of the modules and/or data structures may be combined, separated, and/or be structured in different ways depending upon the implementation of the mobile device 200. For example, the RSSI module 220, the RTT module 222, and/or any of the other modules, may each be realized, at least partially, as a hardware-based implementation, and may thus include such devices as a dedicated antenna (e.g., a dedicated RTT and/or RSSI antenna), a dedicated processing unit to process and analyze signals received and/or transmitted via the antenna(s) (e.g., to determine signal strength of a received signals, determine timing information in relation to an RTT cycle), etc. Additionally, the behavior engine 226 may be implemented in hardware, or as a hardware/software combination.

The application module 218 may be a process running on the processor/controller 210 of the mobile device 200, which requests position information from the positioning module 216. Applications typically run within an upper layer of the software architectures, and may include indoor navigation applications, shopping applications, location aware service applications, etc. In some embodiments, use of the applications by the device may be possible only to the extent permitted within the venue area in accordance with location-based restrictions provided to the mobile device. For example, applications that acquire image data (e.g., via an onboard camera) may not be allowed to run in the venue area in which the device is determined to be located (as may be indicated by the venue area's location-based restrictions), and accordingly, a user may be required to disable the camera and/or the applications that use image data while the device is located within the venue area (additionally and/or alternatively, a behavior engine may be configured to automatically disable the camera in accordance with restrictions provided by the venue server). The positioning module 216 may derive the position of the mobile device 200 using information derived from various receivers and modules of the mobile device 200. For example, to determine the mobile device's position based on RTT measurements, reasonable estimates of processing time delays introduced by each access point may first be obtained and used to calibrate/adjust the measured RTTs. The measured RTTs may be determined by the RTT module 222, which can measure the timings of signals exchanged between the mobile device 200 and the access points to derive round trip time (RTT) information. Once measured, the RTT values may be passed to the positioning module 216 to assist in determining the position of the mobile device 200.

Other information that may be determined from communications received by the mobile device 200 (e.g., using one of its transceivers) includes the received signal power, which may be represented in the form of RSSI (determined using, for example, the RSSI module 220). The RSSI module 220 may thus also provide data regarding the signals to the positioning module 216. When using RSSI measurements to determine a mobile device's position, appropriate calibration/adjustment procedures may need to be performed. A determined position of the mobile device 200 may then be provided to the application module 218.

As noted, in some embodiments, a mobile device may be equipped with a behavior engine 226 that is configured to control (e.g., through the processor 210) use of some or all of the device's modules/units/features in accordance with the location-based restrictions communicated from the venue server of the venue area. The location-based restrictions may indicate, for example, which modules/units/features of the device 200 need to be disabled (partly or fully), whether there are some areas that should not be accessed by the mobile device (and if such areas are accessed, as may be determined by the positioning module 216, various features of the device should be immediately disabled), whether there are any data access restrictions, etc.

In some embodiments, the behavior engine 226 may be a trusted behavior engine, i.e., a device control module/engine that is recognized by the venue server of the venue area where the device is located to monitor and regulate the operations of the device 200 on which the engine 200 is running Devices that include a trusted behavior engine may thus enable a reduced level of monitoring by the venue server of the device's level of compliance with the location-based restrictions as the engine may be assumed to ensure compliance of the device with the location-based restrictions of the venue area in question. Thus, in some embodiments, the behavior engine may be configured to enforce (at least in part) the location-based restrictions corresponding to the venue area and/or to monitor (at least in part) whether the device complies with the location-based restrictions. In some embodiments, devices that include a trusted engine may be identified in a pre-determined list stored on a database (e.g., maintained on one of the servers associated with the venue area) of devices that are pre-cleared or pre-authorized to have their onboard behavior engine manage and control operations of the devices in accordance with the location-based restrictions. In some embodiments, a device may indicate to the venue server that it houses a trusted behavior engine (and thus can be trusted to control and manage the device's operations in conformity with the local restrictions) by including a unique code or ID in control messages transmitted by the device. In some implementations, only devices that are known to have a trusted engine (identity of devices may be communicated to other nodes via messages containing the devices' MAC IDs, or IDs stored on modules such as SIM cards), or can indicate that they house a trusted engine, may be authorized to receive services from the one or more servers associated with the venue area. For example, devices that include a secure (i.e., trusted) behavior engine may be allowed to connect to servers associated with the venue area and may be authorized to receive data and communication resources, while all other devices may not be allowed to connect to the servers and receive services.

In some embodiments, a behavior engine, such as the behavior engine 226 schematically depicted in FIG. 2, may be configured to negotiate with the venue server (or with some other remote server which may, or may not, be located at or near the venue server) the location-based restrictions that are to be imposed on the mobile device. For example, in response to detection (e.g., by one of the servers and/or nodes associated with the venue area) of a mobile device (such as the mobile device 200), and identification of the detected device as including a trusted behavior engine, the venue server may cause a message that includes the venue area's restrictions to be transmitted to the device. Upon receipt of the restrictions messages, the trusted engine may determine if it is configured to control operation of the device in accordance with all the requirements indicated by the restrictions. For example, the restrictions indicated in the received message may require the device to disable the device's WWAN operability (e.g. cellular connectivity), but the behavior engine may not be configured to disable the cellular connection. As a result, the venue server may decide to not give access to the device to the proprietary (secure) data storage available. This will ensure that the device will not be able to send any such data out over its cellular connection. On the other hand, a trusted behavior engine that is indeed able to switch off the device's cellular connection would be allowed to connect to the local network, and access restricted files.

Upon determination of the extent to which the device can enforce the restrictions required by the venue server, the device may send a further message indicating acceptance and/or rejections of anyone of the restrictions. The venue server may, in turn, determine, based on the response received from the device, what services and/or functionality it will allow the device to have and/or whether enforcement of the restrictions will be entrusted to the behavior engine or be controlled by the venue server. In some embodiments, the behavior engine may also be configured to negotiate level and nature of service to be provided by the nodes of the venue area (e.g., the quality-of-service, or QoS, that is to be delivered, the particular communication mode/protocol to be used, encryption parameters, etc.)

The mobile device 200 may further include a user interface 250 which provides suitable interface systems, such as a microphone/speaker 252, keypad 254, and a display 256 that allows user interaction with the mobile device 200. The microphone/speaker 252 provides for voice communication services (e.g., using the wide area network transceiver(s) 204 and/or the local area network transceiver(s) 206). The keypad 254 may comprise suitable buttons for user input. The display 256 may comprise a suitable display, such as, for example, a backlit LCD display, and may further include a touch screen display for additional user input modes.

Figure 3:
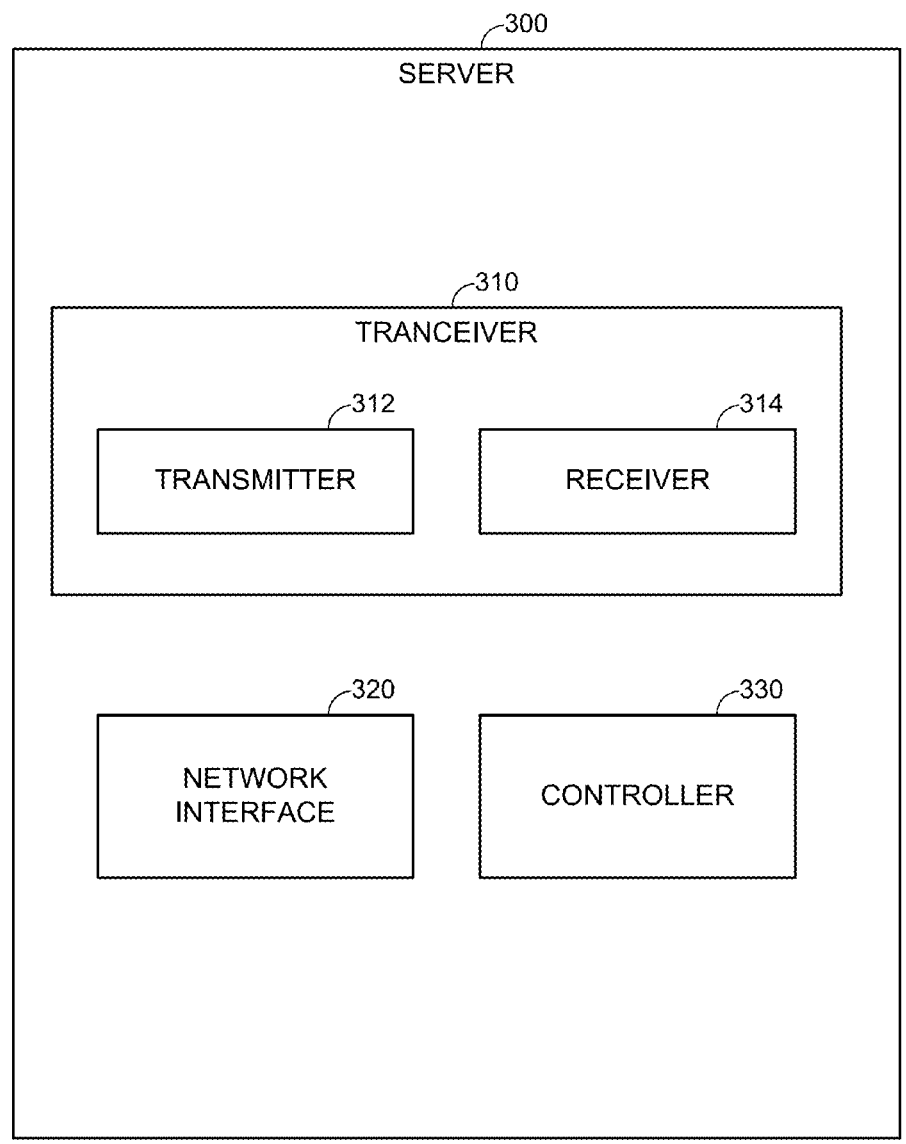
FIG. 3 is a schematic diagram of an example server node.

With reference to FIG. 3, a schematic diagram of an example server node 300 implementing location-based-restrictions-enforcement functionality is shown. The server 300 may thus include a transceiver 310 for communicating with wireless nodes, such as, for example, the mobile device 108 of FIG. 1, as well as other access points such as access points associated with a particular venue (with one or more of the access points coupled to, or otherwise implementing, servers). The transceiver 310 may include a transmitter 312 for sending signals (e.g., downlink messages) and a receiver 314 for receiving signals (e.g., uplink messages). Similarly, the server may include a network interface 320 to communicate with other network nodes (e.g., sending and receiving queries and responses). For example, each network element may be configured to communicate (e.g., wired or wireless backhaul communication) with a gateway, or other suitable entity of a network, to facilitate communication with one or more core network nodes (e.g., any of the other access points shown in FIG. 1, the positioning server 110, and/or other network devices or nodes). Additionally and/or alternatively, communication with other network nodes may also be performed using the transceiver 310.

The server 300 may also include other components that may be used in conjunction with embodiments described herein. For example, the server 300 may include, in some embodiments, a controller 330 to manage, for example, communications with other nodes (e.g., sending and receiving messages) and to provide other related functionality. For example, the controller 330 may be configured to, among other functions, detect presence of mobile devices and/or determine the position of such mobile devices, provide such mobile devices with data representative of restrictions in a venue area associated with the server 300 (e.g., use-policy implemented in the venue area), authorize provisioning of services to one or more of such mobile devices, monitor and determine (at least in part) compliance with the venue area' location-based restrictions by mobile devices receiving services from the venue area' servers, and maintain the provisioning of services to receiving mobile devices based on the devices' determined compliance with the venue area's location-based restrictions. As noted, in embodiments in which a mobile device, receiving services from the servers/nodes associated with the venue area, includes a trusted behavior engine that can control operation of the device in accordance with the restrictions associated with the venue area, determination of compliance of such receiving mobile devices with the location-based restrictions may be entrusted to the devices themselves (with at least some of the monitoring and determination of compliance performed via the devices' trusted behavior engines). The controller 330 may be implemented, in some embodiments, as a processor-based device, with a configuration and functionality similar to that shown and described in relation to FIG. 6.

Figure 4:
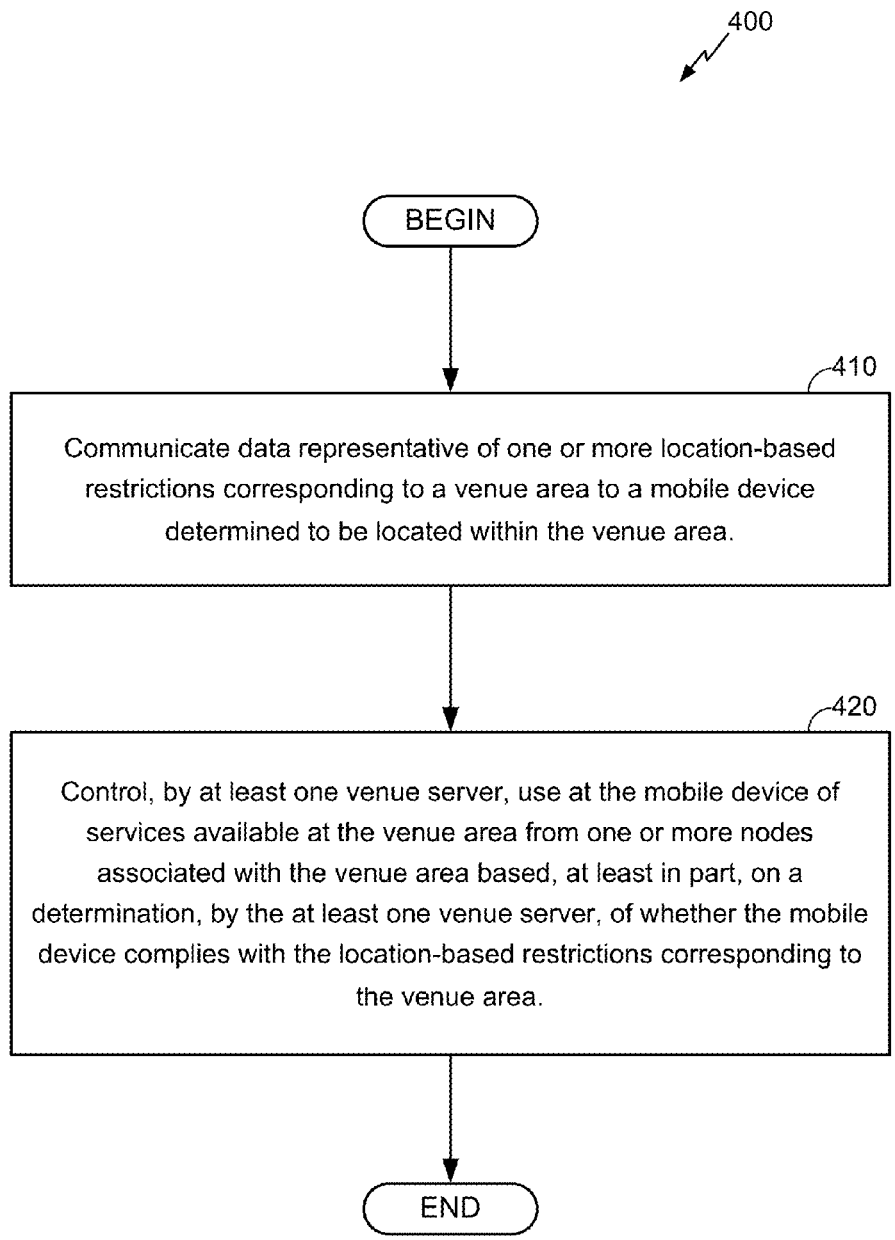
FIG. 4 is a flowchart of an example procedure to enforce location-based restrictions (generally performed by a server node).

With reference now to FIG. 4, a flow chart of an example procedure 400 to enforce location-based restrictions is shown. The operations depicted in FIG. 4 are generally performed at a server node associated with a venue area in which service restrictions for the venue area are to be enforced. The procedure 400 includes communicating 410 data representative of one or more location-based restrictions corresponding to a venue area to a device (e.g., mobile device) determined to be located within a venue area (e.g., retrieving from storage coupled to the venue server, or from some other local or remote server, content data and/or control signals/commands/instructions representative of the location-based restrictions, and transmitting the retrieved data and signals to the destination mobile device via one or more of the transceivers of the venue's nodes/servers). In some embodiments, the data representative of the restrictions may be communicated to a device that may later enter an area corresponding to the venue area). The location-based restrictions may constitute a use-policy, and may include restrictions regarding physical entry into restricted regions in the venue area, requirements regarding access of restricted content data (e.g., restrictions on obtaining adult-rated content, restrictions about obtaining data from certain servers or locations, restrictions on obtaining data residing at the one or more servers associated with the venue area), etc. In some embodiments, the restrictions are provided in the form of content that is presented on the device through one of the devices output units/modules (the device's display, speaker, etc.), and to which the device's user needs to provide a confirmation that the user understood and accepts the restrictions associated with the venue area. In embodiments in which the device includes a behavior engine configured to control at least some of the operations/functionality of the device, the location-based restrictions may include instructions, commands, or control signals that can be executed by the device (e.g., through the behavioral engine) to regulate/control the device's operations. For example, the received restrictions may require that cellular communication be suspended, an onboard camera be deactivated, and that certain network content sites not be accessed. When the device includes a behavioral engine, the behavior engine may be configured to deactivate the cellular transceiver (e.g., a transceiver such as the transceiver 204 of the device 200), to deactivate the onboard camera, and may screen or filter out data requests from network locations (e.g., accessed, for example, through WLAN access points) made by the device. As noted, while a behavioral engine may facilitate enforcing the venue area's location-based restrictions and/or monitoring compliance, the device's compliance with those restrictions may still be monitored and controlled by the venue server (or some other server or node associated with the venue area), at least to some extent.

A determination that a mobile device is within the venue area, and thus needs to be provided with the one or more restrictions for the venue area, may be performed in several ways. For example, in some embodiments, one or more of the nodes associated with the venue area can detect the presence of a mobile device through detection of signals transmitted by the mobile device. A determination may then be made that the mobile device is within a venue area associated with the detecting nodes when the device's signal are detected by some pre-determined number of the nodes associated with the venue area. For example, when at least three nodes (e.g., any three of the access points 104a-c and 106a-e in the example of FIG. 1) detect signals transmitted by the mobile device (such as the device 108 in the example of FIG. 1), the mobile device may be deemed to be within the venue area associated with the detecting nodes. In some embodiments, detection of the device within the venue area may be achieved by one of the servers/nodes associated with the venue area (e.g., by a location server, such as a Cisco MSE server) receiving a request for service from the mobile device.

In some embodiments, the mobile device's approximate or exact location may be determined to thus enable determining if the mobile device is within the boundaries of the venue area. In some embodiments, the location of a mobile device may be determined through SPS-location determination procedures, WLAN-based location determination procedures, through standalone services such as GPS or Skyhook/XtraT, etc. Generally, determining the device's location includes obtaining data to enable/facilitate location determination, and determining the location of the device based, at least in part, on the obtained data. In some embodiments, the position of the device may be determined based on signals received from remote transmitters (for example, one or more of the nodes associated with the venue area) using, for example, a module whose functionality is similar to that of the positioning module 216 depicted in FIG. 2. Accordingly, a mobile device may be configured to receive signals from one or more remote transmitters, such as any of the satellite and/or nodes/access points 102, 104, and/106 of FIG. 1 and to determine its position based, for example, on multilateration techniques. For example, the device's position may be determined using RSSI or RTT parameters (e.g., using an RTT module, such as the RTT module 222 implemented in the example embodiment of the mobile device 200, and/or an RSSI module, such as the RSSI module 220 of the mobile device 200) associated with received signals from one or more remote transmitters, and based on the known locations of the remote transmitters, to determine the position of the mobile device. In another example, the device's position may be determined based on signal profile identification techniques, e.g., by comparing determined parameter values of, for example, RSSI and/or RTT, to stored profiles that are associated with pre-determined positions.

In embodiments in which the device's location is determined based on such metrics as RSSI and/or RTT, measurements of signals received from one or more remote transmitters, e.g., nodes/access points (each of which may be identified by an access point identifier, such as a unique MAC address associated with the access point), can be used to determine an estimate of the device's location. For example, a database (which may be stored locally at a memory module, such as the module 224 shown in FIG. 2, housed on the mobile device), containing geographic locations, processing delays, power profiles, RTT profiles, and other such information for multiple access points with known geographical positions, may be accessed and relevant data (e.g., for particular transmitters/access points from which signals at the receiver were received) may be obtained. The database data so obtained may be used to facilitate location determination of the device. For example, the relative distances of the device receiving the signals from the transmitters/nodes transmitting the signals may be determined based, at least in part, on known locations for those transmitters/nodes stored on the database, and an estimation of the location of the device may be computed/derived (e.g., using multilateration procedures, such as a trilateration procedure). As noted, in some embodiments, the position of the mobile device may be also be determined, for example, by comparing the actual measured values of signal strength (or RSSI) and/or RTT obtained from one or more nodes, to stored profiles to identify a profile matching (approximately or precisely) the set of metric values determined by the mobile device. A location estimate associated with a matching stored profile may then be deemed to be an estimate of the current location of the device receiving the transmitters'/nodes' signals.

In some embodiments, the mobile device may be operating inside an indoor environment where satellite signals and/or signals from WWAN access points are generally more difficult to receive, and therefore the location of the mobile device may be determined from signals received from one or more WLAN (e.g., WiFi devices, Bluetooth devices, femtocells, etc.), which may be similar to the WLAN access points 106a-e depicted in FIG. 1.

In some embodiments, the nodes/access points providing the signals based on which location determination procedures may be performed may be part of a QUIPS (Qualcomm Indoor-Positioning System) implementation. In such embodiments, positioning determination may be performed as follows. Initially, an LCI discovery process is performed (an LCIs, or location context identifiers, refers to identifiers associated with such geographical areas as, for example, floors of a building). The discovery process causes transmission of a request to a server that identifies all LCIs. The discovery process results in determination of a coarse position of the mobile device based, for example, on MAC id's that are seen/detected by the mobile device. The server communicates a set of candidate LCIs to the mobile device with a list of access points. Following the LCI discovery process, an LCI disambiguation process is performed, where one or more criteria (such as the number of access points currently visible from each LCI, e.g., number of access points currently visible from each floor, maximum RSSI values from each LCI, median RSSI values from each LCI, etc.) may be applied to select an LCI from the candidate list. Once an LCI from a set of candidate LCIs, has been chosen, a positioning process based on, for example, RSSI and/or RTT may be performed. For example, targeted scans of access point(s), limited to those associated with the selected LCI, provide the RSSI or RTTs required to determine a position approximation for the mobile device's location.

In some embodiments, the determined location of the mobile device may be provided as a global geographical position coordinates corresponding to the location of the device, and/or as a location context identifier (or some other identifier type) for the device (e.g., indicating a floor of a building where the device is located, or some other type of an identifiable geographic region where the device may be located). The current location of the device may also be identified according to whether the device is located in a secure or non-secure area, and/or whether the device in a public or private location. Thus, in some embodiments, determining the location of the device may include determining whether the location of the device includes one or more of, for example, a secure public location, a non-secure public location, a secure private location, and/or a non-secure private location.

Once the device location has been determined, the mobile device (or a remote positioning server, such as the server 110 depicted in FIG. 1, to which the signals, or associated signal measurements, received by the device have been forwarded in order to determine the device's position) may transmit the determined location to the venue server, whereupon a determination may be made of whether the device is within the venue area. In some embodiments, the mobile device's position may also be determined based on signals transmitted by the device and received by one or more nodes (those nodes may be part of the nodes associated with the venue area, or other nodes). Determination of the device's position based on signals transmitted by device may be performed in a manner similar to the position determination based on signals received by the mobile device whose position is to be determined.

With continued reference to FIG. 4, with the device having obtained the location-based restrictions associated with the venue area, use at the device of services available at the venue area from one or more nodes associated with the venue area is controlled 420 (e.g., by at least one venue server) based (at least in part) on a determination, by the at least one venue server, of whether the mobile device complies (or does not comply) with the location-based restrictions corresponding to the venue area. For example, the venue server may cause the services available at the venue area (from the one or more nodes) to continue being provided to the mobile device when the device is determined to comply with the location-based restrictions corresponding to the venue area. In some embodiments, the venue server may be configured to enable the use at the device of the services available at the venue area from the one more servers associated with the venue area when the device is determined, by the venue server, to comply with the one or more location-based restrictions corresponding to the venue area.

In some embodiments, controlling, by the at least one venue server, the use at the device of the services available at the venue area may include initiating one or more enforcement operations in response to a determination that one or more violations by the device of the location-based restrictions have occurred. For example, in situations where the location-based restrictions impose restrictions on entry of the device into restricted areas (e.g., such as the area 122 shown in FIG. 1, which may be a secure area), the venue server may continually/periodically obtain information regarding the location of the device whose access to the venue's services is to be controlled. The position information may be communicated from the mobile device (when the mobile device determines its position), from a dedicated position server configured to determine position of device based on signal measurements associated with the device, or through at least one of the nodes associated with the venue server. The continual/periodical determination of the position of the device may be performed in the manner similar to that performed to determine whether the position of the device was within the venue area so that the device could be provided with the location-based restrictions. The periodic determination of the mobile device's position can then be compared to a map or other types of data representative of the area of the venue. Upon a determination, based on the current determined position of the mobile device and based on the data representative of the area of the venue, that the device has moved outside the venue area or has moved to a restricted area that according to the location-based restrictions the device was not supposed to enter, the venue server may send a notification to the device that a violation of the restrictions has occurred and/or may make a change to the services provided to the device. For example, the venue server may cause communication links between the various venue area's nodes and the device to be suspended or terminated, may cause a reduction in the traffic of data that can be provided to the mobile device (i.e., reduce the allowed bandwidth to the mobile device, or lower the Quality of Service provided to the device), and/or take other actions responsive to the violation of the location-based restrictions pertaining to entry or access to restricted areas in the venue area. In some embodiments, the previous level of service provided to the mobile device prior to the violation may be restored once the device or its user has taken remedial actions to cure the violation (e.g., the device has left the restricted area). In some embodiments, a counter may be maintained by the venue server to keep track of the number of violations committed by the device being monitored, and when a certain pre-determined number of violations has occurred during a particular time period (e.g., 3 violations in any 1-hour period, 5 violations during a 3-hour period, etc.), the venue server may impose more permanent action responsive to the violations (e.g., suspend or terminate links to the mobile device indefinitely).

In another example, the location-based restrictions may include restrictions about the data content that may be accessed by the mobile device while it is located within the venue area. In this example, the venue area's access points and/or other nodes may be equipped with data filters configured to monitor and determine the nature of data requested by the device (from the venue's servers or from other remote locations that may be accessed via network connections). Upon a determination that restricted data has been requested and/or is being sent to the mobile device, the venue server may initiate enforcement operations by, for example, causing suspension or termination of communication links between the venue's nodes and the mobile device, discarding the restricted content before it is transmitted to the mobile device, sending a warning to the device (presentable on one of the device's output units) that a violation has occurred, etc. Here too, the severity of the enforcement operation may depend, at least in part, on whether there have been past violations, the gravity of the current violation, and other such factors.

In yet another example, the location-based restrictions may include restrictions that cellular communication (e.g., through WWAN access points based on CDMA, TDMA, WiMax, etc.), and/or use of a device-based camera, not be used while the mobile device is within the venue area (e.g., while the mobile device position, determined periodically/continually, is within an area corresponding to the venue area). In response to an attempt by the mobile device to establish cellular access (as may be detected by one of the access points associated with the venue area detecting, for example, a request signal/message to establish cellular communication through one of the venue area's WWAN-based nodes, or through a remote node), the venue server may cause suspension or termination of any cellular link established between the mobile device and the venue server's cellular nodes. If the mobile device is attempting to establish a cellular link with a remote WWAN access point (one not associated with the venue area), the venue server may initiate enforcement operations by, for example, causing suspension or termination of communication links between the venue's nodes (e.g., WLAN nodes) and the mobile device, causing a degradation in the service provided to the mobile device, sending a warning to the device (presentable on one of the device's output units) that a violation has occurred, etc.

Thus, in some embodiments, the one or more enforcement operations, that may be taken by the venue server (or some other server associated with the venue area) in response to a determination that a violation by the device of the one or more location-based restrictions has occurred, may include, for example, causing suspension or termination of at least one communication link between at least one of the nodes associated with the venue area and the device, causing restricted content destined to the device to be discarded before it is transmitted to the device, and/or sending a warning to the device that a violation has occurred.

Figure 5:
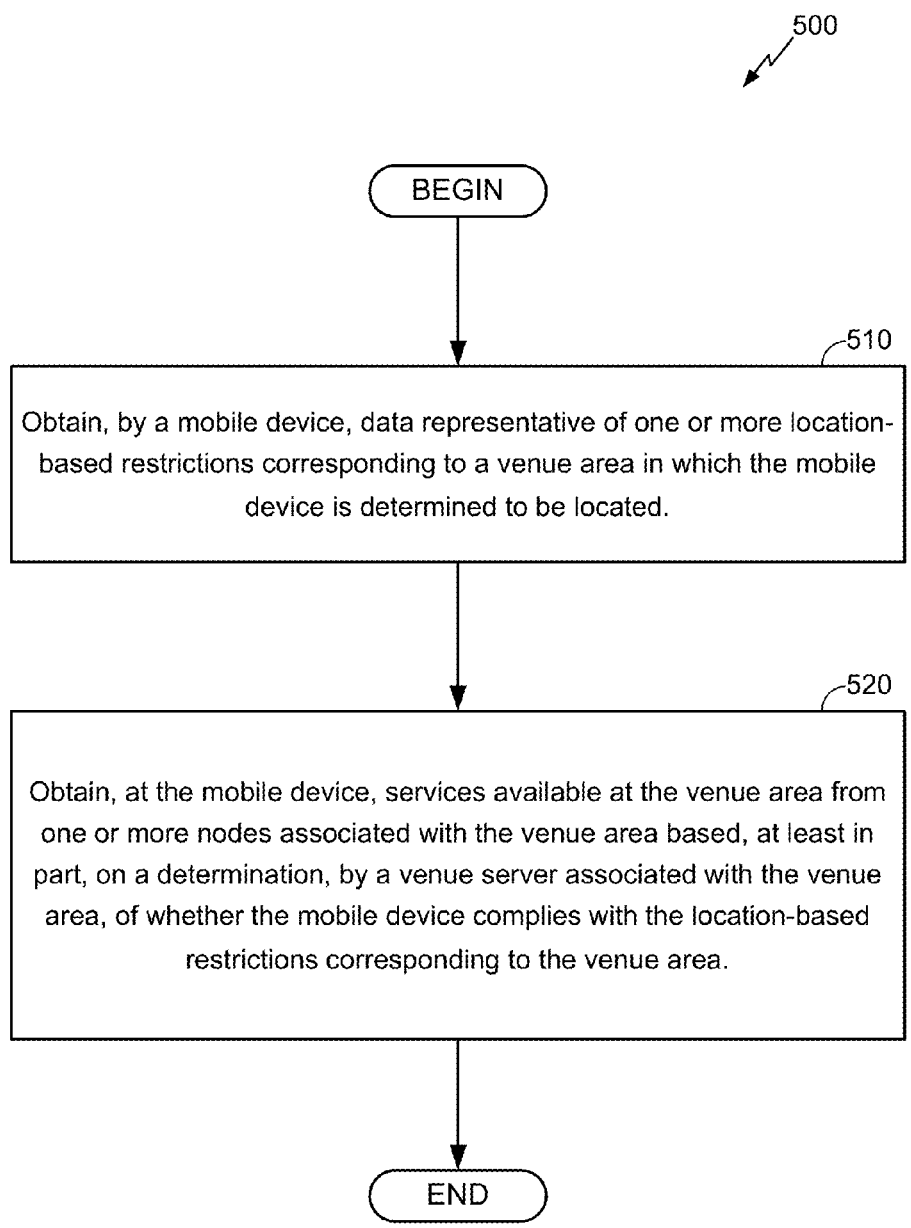
FIG. 5 is a flowchart of another example procedure to enforce location-based restrictions (generally performed by a mobile device).

With reference now to FIG. 5, a flowchart of an example procedure 500 to enforce location-based restrictions is shown. The operations depicted in FIG. 5 are generally performed at a device seeking to obtain services in a venue area in which location-based restrictions for the venue area are to be enforced. The procedure 500 includes obtaining 510, by a mobile device (which may be similar to the mobile devices 108 and 200 depicted in FIGS. 1 and 2, respectively) data representative of one or more location-based restrictions corresponding to a venue area in which the device is determined to be located (e.g., receiving through one of the transceivers of the device data representative of location-based restrictions, and storing and/or processing the received data). As noted, the location-based restrictions, which may include restrictions regarding access to specific geographical areas within the venue area, restrictions regarding content that is allowed to be accesses, restrictions about certain device-based features (e.g., prohibitions about using the camera or establishing cellular access while continuing to be in the venue area), may be communicated from at least one venue server associated with the venue area, from a remote server (not necessarily associated with the venue area) which may be globally accessible by multiple devices, etc.

In some embodiments, location-based restrictions corresponding to various venue areas (and/or venue types, such as private-secure venue, public, secure venue, private-non-secure venue, and public non-secure venue) may have been communicated to the device (via one or more types of communications links supported by the device) at some earlier point. Subsequently, when the device is detected to be within one of the venue areas (or its position is determined, in accordance with one or more of the position determination procedures described herein, to be within the that one of the venue areas) for which a corresponding set of location-based restrictions was previously communicated, the device may retrieve from its storage the appropriate set of location-based restrictions to facilitate enforcement of the restrictions by the device. As noted, in some embodiments, the location-based restrictions may be presented to the user (e.g., on one of the output units of the device) and require the user to confirm understanding and acceptance of the restrictions. In some embodiments, the device may include a behavior engine configured to control operations/features of the device in accordance with the location-based restrictions. In situations where the behavior engine is a trusted behavior engine (e.g., an engine that has pre-cleared or pre-authorized to enforce and ensure, at least in part, compliance with the location-based restrictions), at least some of the compliance-ensuring operations may be entrusted to the trusted behavior engine. As further shown in FIG. 5, the procedure 500 also includes obtaining 520, at the mobile device, services available at the venue area from one or more nodes associated with the venue area based (at least in part) on a determination (e.g., by a venue server associated with the venue area) of whether the mobile device complies (or does not comply) with the location-based restrictions corresponding to the venue area. For example, the device may obtain the service available at the venue area when the device is determined (by, at least in part, the venue server) to comply with the location-based restrictions corresponding to the venue area. Thus, in some embodiments, the venue server of the venue area in which the mobile device is determined to be located maintains at least some of the compliance monitoring operations to ensure that the mobile device adheres to the location-based restrictions corresponding to the particular venue area. In some embodiments, at least some of the monitoring and/or evaluation operation to determine compliance of the device with the location-based restrictions may be performed by a behavioral engine housed or hosted on the mobile device. As noted, the venue server may initiate various enforcement operations, e.g., causing suspension or termination of at least one communication link between at least one of the nodes associated with the venue area and the device, causing restricted content destined to the device to be discarded before it is transmitted to the device, sending a warning to the device that a violation has occurred, etc. The initiation of enforcement operations may result in degraded services relative to the services that the mobile has thus far received. If a device has a behavior engine installed, that behavior engine may too perform some enforcement operations.

Figure 6:
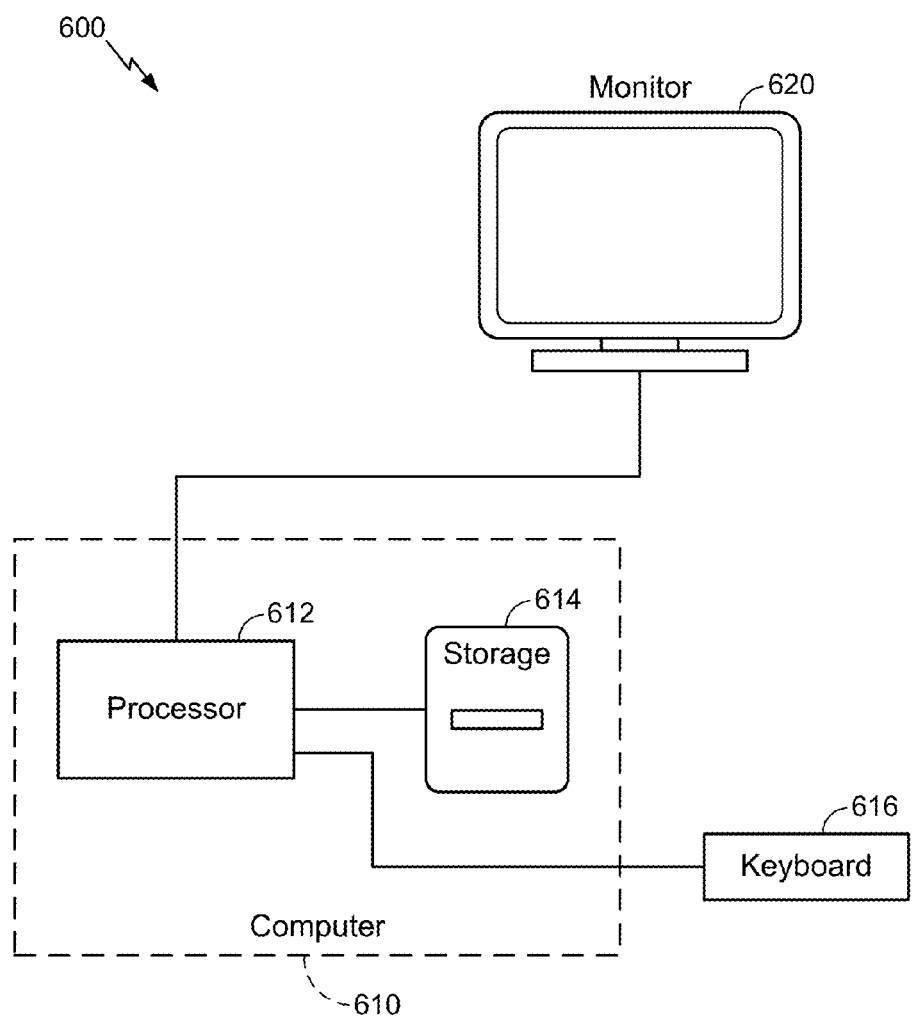
FIG. 6 is a schematic diagram of an example computing system.

Performing the procedures to, for example, enforce location-based restrictions, determine position of a mobile device, etc., may be facilitated by a processor-based computing system. With reference to FIG. 6, a schematic diagram of an example computing system 600 is shown. The computing system 600 may be housed in, for example, a handheld mobile device such as the devices 108 and 200 of FIGS. 1 and 2, respectively, a venue area node, such as the node depicted in FIG. 3, etc. The computing system 600 includes a processor-based device 610 such as a personal computer, a specialized computing device, and so forth, that typically includes a central processor unit 612. In addition to the CPU 612, the system includes main memory, cache memory and bus interface circuits (not shown). The processor-based device 610 may include a mass storage device 614, such as a hard drive and/or a flash drive associated with the computer system. The computing system 600 may further include (e.g., for implementations of, for example, servers or other stationary computing devices) a keyboard, or keypad, 616, and a monitor 620, e.g., a CRT (cathode ray tube) or LCD (liquid crystal display) monitor, that may be placed where a user can access them (e.g., a mobile device's screen).

The processor-based device 610 is configured to, for example, implement procedures to enforce location-based restrictions, perform position determination operations, perform location determination, procedure, perform other general computer-based operations, etc. The mass storage device 614 may thus include a computer program products that when executed on the processor-based device 610 causes the processor-based device to perform operations to facilitate the implementation of the above-described procedures.

The processor-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), a DSP processor, or an ASIC (application-specific integrated circuit) may be used in the implementation of the computing system 600. Other modules that may be included with the processor-based device 610 are speakers, a sound card, a pointing device, e.g., a mouse or a trackball, by which the user can provide input to the computing system 600. The processor-based device 610 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" may refer to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the processing unit or external to the processing unit. As used herein the term "memory" refers to any type of long term, short term, volatile, nonvolatile, or other memory and is not to be limited to any particular type of memory or number of memories, or type of storage media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method comprising:
   communicating data representative of one or more location-based restrictions corresponding to a venue area to a mobile device determined to be located within the venue area; and
   controlling, by at least one venue server, use at the mobile device of services available at the venue area from one or more nodes associated with the venue area based, at least in part, on a determination, by the at least one venue server, of whether the mobile device complies with the one or more location-based restrictions corresponding to the venue area, wherein controlling use of the services available at the venue area comprises:
      determining, by the at least one venue server, occurrence of one or more violations made by the mobile device of the one or more location-based restrictions,
      maintaining a count of a number of violations made by the mobile device of the one or more location-based restrictions during a particular period of time, and
      reducing provisioning of the services available at the venue area from the one or more nodes associated with the venue area to the mobile device based, at least in part, on the count of the number of violations made by the mobile device of the one or more location-based restrictions during the particular period of time.

2. The method of claim 1, wherein communicating the data representative of the one or more location-based restrictions comprises:
   transmitting to a trusted engine executing on the mobile device the data representative of the one or more location-based restrictions corresponding to the venue area in which the mobile device is determined to be located, wherein the trusted engine is configured to negotiate and to enforce, at least in part, the one or more location-based restrictions corresponding to the venue area.

3. The method of claim 2, wherein the trusted engine is further configured to:
   determine, at least in part, whether the mobile device complies with the one or more location-based restrictions corresponding to the venue area.

4. The method of claim 1, wherein communicating the data representative of the one or more location-based restrictions comprises:
   communicating data representative of use-policy within the venue area in which the mobile device is determined to be located.

5. The method of claim 4, wherein the use policy comprises one or more of:
   requirements regarding physical entry into restricted regions in the venue area, or requirements regarding access of restricted content data.

6. The method of claim 5, wherein the restricted content data comprises at least some of data residing at the one or more nodes associated with the venue area.

7. The method of claim 1, wherein controlling, by the at least one venue server, the use at the mobile device of the services available at the venue area further comprises:
   enabling, by the at least one venue server, the use at the mobile device of the services available at the venue area from the one more nodes associated with the venue area when the mobile device is determined, by the at least one venue server, to comply with the one or more location-based restrictions corresponding to the venue area.

8. The method of claim 1, wherein controlling, by the at least one venue server, the use at the mobile device of the services available at the venue area further comprises:
   initiating one or more enforcement operations in response to another determination that the one or more violations by the mobile device of the one or more location-based restrictions have occurred.

9. The method of claim 8, wherein the one or more enforcement operations comprise one or more of: causing suspension or termination of at least one communication link between at least one of the one or more nodes associated with the venue area and the mobile device, causing restricted content destined to the mobile device to be discarded before it is transmitted to the mobile device, or sending a warning message to the mobile device that a violation has occurred.

10. The method of claim 1, wherein the services available at the venue area comprise one or more of: communication services, or data services.

11. The method of claim 1, further comprising:
   determining, by the at least one venue server, location of the mobile device.

12. The method of claim 11, wherein determining the location of the mobile device comprises:
   determining one or more of: a global geographical position coordinates corresponding to the location of the mobile device, a location context identifier for the mobile device, or another identifier associated with the location of the mobile device.

13. The method of claim 1, wherein communicating the data representative of the one or more location-based restrictions corresponding to the venue area to the mobile device comprises:
   communicating the data representative of the one or more location-based restrictions corresponding to the venue area to the mobile device determined, by the mobile device, to be located within the venue area.

14. The method of claim 1, wherein reducing the provisioning of the services to the mobile device based, at least in part, on the count of the one or more violations made by the mobile device of the one or more location-based restrictions during the particular period of time comprises:

suspending one or more of the services from the one or more nodes associated with the venue area to the mobile device when the number of violations during the particular period of time exceeds a pre-determined number of violations.

15. A server comprising:
one or more processors; and
storage media comprising computer instructions that, when executed on the one or more processors, cause operations comprising:
   communicating data representative of one or more location-based restrictions corresponding to a venue area to a mobile device determined to be located within the venue area; and
   controlling, by the server, use at the mobile device of services available at the venue area from one or more nodes associated with the venue area based, at least in part, on a determination, by the server, of whether the mobile device complies with the one or more location-based restrictions corresponding to the venue area, wherein controlling use of the services available at the venue area comprises:
      determining, by the server, occurrence of one or more violations made by the mobile device of the one or more location-based restrictions,
      maintaining a count of a number of violations made by the mobile device of the one or more location-based restrictions during a particular period of time, and
      reducing provisioning of the services available at the venue area from the one or more nodes associated with the venue area to the mobile device based, at least in part, on the count of the number of violations made by the mobile device of the one or more location-based restrictions during the particular period of time.

16. The server of claim 15, wherein communicating the data representative of the one or more location-based restrictions comprises:
   transmitting to a trusted engine executing on the mobile device the data representative of the one or more location-based restrictions corresponding to the venue area in which the mobile device is determined to be located, wherein the trusted engine is configured to negotiate and to enforce, at least in part, the one or more location-based restrictions corresponding to the venue area.

17. The server of claim 16, wherein the trusted engine is further configured to:
   determine, at least in part, whether the mobile device complies with the one or more location-based restrictions corresponding to the venue area.

18. The server of claim 15, wherein communicating the data representative of the one or more location-based restrictions comprises:
   communicating data representative of use-policy within the venue area in which the mobile device is determined to be located, wherein the use policy comprises one or more of: requirements regarding physical entry into restricted regions in the venue area, or requirements regarding access of restricted content data.

19. The server of claim 15, wherein controlling, by the server, the use at the mobile device of the services available at the venue area further comprises:
   enabling, by the server, the use at the mobile device of the services available at the venue area from the one more nodes associated with the venue area when the mobile device is determined, by the server, to comply with the one or more location-based restrictions corresponding to the venue area.

20. The server of claim 15, wherein controlling, by the server, the use at the mobile device of the services available at the venue area further comprises:
   initiating one or more enforcement operations in response to another determination that the one or more violations by the mobile device of the one or more location-based restrictions have occurred.

21. The server of claim 20, wherein the one or more enforcement operations comprise one or more of: causing suspension or termination of at least one communication link between at least one of the one or more nodes associated with the venue area and the mobile device, causing restricted content destined to the mobile device to be discarded before it is transmitted to the mobile device, or sending a warning message to the mobile device that a violation has occurred.

22. The server of claim 15, wherein the services available at the venue area comprise one or more of: communication services, or data services.

23. The server of claim 15, further comprising:
   determining, by the server, location of the mobile device, including determining one or more of: a global geographical position coordinates corresponding to the location of the mobile device, a location context identifier for the mobile device, or another identifier associated with the location of the mobile device.

24. The server of claim 15, wherein communicating the data representative of the one or more location-based restrictions corresponding to the venue area to the mobile device comprises:
   communicating the data representative of the one or more location-based restrictions corresponding to the venue area to the mobile device determined, by the mobile device, to be located within the venue area.

25. An apparatus comprising:
means for communicating data representative of one or more location-based restrictions corresponding to a venue area to a mobile device determined to be located within the venue area; and
means for controlling, by a server, use at the mobile device of services available at the venue area from one or more nodes associated with the venue area based, at least in part, on a determination of whether the mobile device complies with the one or more location-based restrictions corresponding to the venue area, wherein the means for controlling use of the services available at the venue area comprises:
   means for determining, by the server, occurrence of one or more violations made by the mobile device of the one or more location-based restrictions,
   means for maintaining a count of a number of violations made by the mobile device of the one or more location-based restrictions during a particular period of time, and
   means for reducing provisioning of the services available at the venue area from the one or more nodes associated with the venue area to the mobile device based, at least in part, on the count of the number of violations made by the mobile device of the one or more location-based restrictions during the particular period of time.

26. The apparatus of claim 25, wherein the means for communicating the data representative of the one or more location-based restrictions comprises:
   means for transmitting to a trusted engine executing on the mobile device the data representative of the one or more location-based restrictions corresponding to the venue area in which the mobile device is determined to be located, wherein the trusted engine is configured to negotiate and to enforce, at least in part, the one or more location-based restrictions corresponding to the venue area.

27. The apparatus of claim 26, wherein the trusted engine is further configured to:
determine, at least in part, whether the mobile device complies with the one or more location-based restrictions corresponding to the venue area.

28. The apparatus of claim 25, wherein the means for communicating the data representative of the one or more location-based restrictions comprises:
means for communicating data representative of use-policy within the venue area in which the mobile device is determined to be located, wherein the use policy comprises one or more of: requirements regarding physical entry into restricted regions in the venue area, or requirements regarding access of restricted content data.

29. The apparatus of claim 25, wherein the means for controlling the use at the mobile device of the services available at the venue area further comprises:
means for enabling the use at the mobile device of the services available at the venue area from the one more nodes associated with the venue area when the mobile device is determined to comply with the one or more location-based restrictions corresponding to the venue area.

30. The apparatus of claim 25, wherein the means for controlling the use at the mobile device of the services available at the venue area further comprises:
means for initiating one or more enforcement operations in response to another determination that the one or more violations by the mobile device of the one or more location-based restrictions have occurred.

31. The apparatus of claim 30, wherein the one or more enforcement operations comprise one or more of: causing suspension or termination of at least one communication link between at least one of the one or more nodes associated with the venue area and the mobile device, causing restricted content destined to the mobile device to be discarded before it is transmitted to the mobile device, or sending a warning message to the mobile device that a violation has occurred.

32. The apparatus of claim 25, wherein the services available at the venue area comprise one or more of: communication services, or data services.

33. The apparatus of claim 25, further comprising:
means for determining location of the mobile device, including determining one or more of: a global geographical position coordinates corresponding to the location of the mobile device, a location context identifier for the mobile device, or another identifier associated with the location of the mobile device.

34. The apparatus of claim 15, wherein the means for communicating the data representative of the one or more location-based restrictions corresponding to the venue area to the mobile device comprises:
means for communicating the data representative of the one or more location-based restrictions corresponding to the venue area to the mobile device determined, by the mobile device, to be located within the venue area.

35. A non-transitory processor readable storage media programmed with a set of instructions executable on a processor that, when executed, cause operations comprising:
communicating data representative of one or more location-based restrictions corresponding to a venue area to a mobile device determined to be located within the venue area; and
controlling, by at least one venue server, use at the mobile device of services available at the venue area from one or more nodes associated with the venue area based, at least in part, on a determination, by the at least one venue server, of whether the mobile device complies with the one or more location-based restrictions corresponding to the venue area, wherein controlling use of the services available at the venue area comprises:
determining, by the at least one venue server, occurrence of one or more violations made by the mobile device of the one or more location-based restrictions,
maintaining a count of a number of violations made by the mobile device of the one or more location-based restrictions during a particular period of time, and
reducing provisioning of the services available at the venue area from the one or more nodes associated with the venue area to the mobile device based, at least in part, on the count of the number of violations made by the mobile device of the one or more location-based restrictions during the particular period of time.

36. The processor readable media of claim 35, wherein communicating the data representative of the one or more location-based restrictions comprises:
transmitting to a trusted engine executing on the mobile device the data representative of the one or more location-based restrictions corresponding to the venue area in which the mobile device is determined to be located, wherein the trusted engine is configured to negotiate and to enforce, at least in part, the one or more location-based restrictions corresponding to the venue area.

37. The processor readable media of claim 36, wherein the trusted engine is further configured to:
determine, at least in part, whether the mobile device complies with the one or more location-based restrictions corresponding to the venue area.

38. The processor readable media of claim 35, wherein communicating the data representative of the one or more location-based restrictions comprises:
communicating data representative of use-policy within the venue area in which the mobile device is determined to be located, wherein the use policy comprises one or more of: requirements regarding physical entry into restricted regions in the venue area, or requirements regarding access of restricted content data.

39. The processor readable media of claim 35, wherein controlling, by the at least one venue server, the use at the mobile device of the services available at the venue area further comprises:
enabling, by the at least one venue server, the use at the mobile device of the services available at the venue area from the one more nodes associated with the venue area when the mobile device is determined, by the at least one venue server, to comply with the one or more location-based restrictions corresponding to the venue area.

40. The processor readable media of claim 35, wherein controlling, by the at least one venue server, the use at the mobile device of the services available at the venue area further comprises:
initiating one or more enforcement operations in response to another determination that the one or more violations by the mobile device of the one or more location-based restrictions have occurred.

41. The processor readable media of claim 40, wherein the one or more enforcement operations comprise one or more of: causing suspension or termination of at least one communication link between at least one of the one or more nodes associated with the venue area and the mobile device, causing restricted content destined to the mobile device to be discarded before it is transmitted to the mobile device, or sending a warning message to the mobile device that a violation has occurred.

42. The processor readable media of claim 35, wherein the services available at the venue area comprise one or more of: communication services, or data services.

43. The processor readable media of claim 35, wherein the instructions cause further operations comprising:
determining, by the at least one venue server, location of the mobile device, including determining one or more of: a global geographical position coordinates corresponding to the location of the mobile device, a location context identifier for the mobile device, or another identifier associated with the location of the mobile device.

44. The processor readable media of claim 35, wherein communicating the data representative of the one or more location-based restrictions corresponding to the venue area to the mobile device comprises:
communicating the data representative of the one or more location-based restrictions corresponding to the venue area to the mobile device determined, by the mobile device, to be located within the venue area.

45. A method comprising:
obtaining, by a mobile device, data representative of one or more location-based restrictions corresponding to a venue area in which the mobile device is determined to be located; and
obtaining, at the mobile device, services available at the venue area from one or more nodes associated with the venue area,
wherein obtaining, at the mobile device, the services available at the venue area from the one or more nodes comprises:
obtaining reduced level of services from the one or more nodes associated with the venue area based on a count of a number of violations made by the mobile device of the one or more location-based restrictions occurring during a particular period of time.

46. The method of claim 45, wherein obtaining the data representative of the one or more location-based restrictions comprises:
receiving by a trusted engine executing on the mobile device the data representative of the one or more location-based restrictions corresponding to the venue area in which the mobile device is determined to be located, wherein the trusted engine is configured to negotiate and to enforce, at least in part, the one or more location-based restrictions corresponding to the venue area.

47. The method of claim 46, wherein the trusted engine is further configured to:
determine, at least in part, whether the mobile device complies with the one or more location-based restrictions corresponding to the venue area.

48. The method of claim 45, wherein obtaining the data representative of the one or more location-based restrictions comprises:
obtaining use policy comprising one or more of: requirements regarding physical entry into restricted regions in the venue area, or requirements regarding access of restricted content data.

49. The method of claim 45, wherein obtaining, at the mobile device, the reduced level of services comprises:
obtaining degraded services, caused through initiation of one or more enforcement operations by the venue server to modify the services available from the one or more nodes, in response to a determination that a pre-determined number of violations by the mobile device of the one or more location-based restrictions have occurred.

50. The method of claim 49, wherein the one or more enforcement operations comprise one or more of: causing suspension or termination of at least one communication link between at least one of the one or more nodes associated with the venue area and the mobile device, causing restricted content destined to the mobile device to be discarded before it is transmitted to the mobile device, or sending a warning to the mobile device that a violation has occurred.

51. A mobile device comprising:
one or more processors; and
storage media comprising computer instructions that, when executed on the one or more processors, cause operations comprising:
obtaining data representative of one or more location-based restrictions corresponding to a venue area in which the mobile device is determined to be located; and
obtaining, at the mobile device, services available at the venue area from one or more nodes associated with the venue area,
wherein obtaining, at the mobile device, the services available at the venue area from the one or more nodes comprises:
obtaining reduced level of services from the one or more nodes associated with the venue area based on a count of a number of violations made by the mobile device of the one or more location-based restrictions occurring during a particular period of time.

52. The mobile device of claim 51, wherein obtaining the data representative of the one or more location-based restrictions comprises:
receiving by a trusted engine executing on the mobile device the data representative of the one or more location-based restrictions corresponding to the venue area in which the mobile device is determined to be located, wherein the trusted engine is configured to negotiate and to enforce, at least in part, the one or more location-based restrictions corresponding to the venue area.

53. The mobile device of claim 52, wherein the trusted engine is further configured to:
determine, at least in part, whether the mobile device complies with the one or more location-based restrictions corresponding to the venue area.

54. The mobile device of claim 51, wherein obtaining the data representative of the one or more location-based restrictions comprises:
obtaining use policy comprising one or more of: requirements regarding physical entry into restricted regions in the venue area, or requirements regarding access of restricted content data.

55. The mobile device of claim 51, wherein obtaining, at the mobile device, the reduced level of services comprises:
obtaining degraded services, caused through initiation of one or more enforcement operations by the venue server to modify the services available from the one or more nodes, in response to a determination that a pre-determined number of violations by the mobile device of the one or more location-based restrictions have occurred.

56. The mobile device of claim 55, wherein the one or more enforcement operations comprise one or more of: causing suspension or termination of at least one communication link between at least one of the one or more nodes associated with the venue area and the mobile device, causing restricted content destined to the mobile device to be discarded before it is transmitted to the mobile device, or sending a warning to the mobile device that a violation has occurred.

57. An apparatus comprising:
means for obtaining data representative of one or more location-based restrictions corresponding to a venue area in which a mobile device is determined to be located; and
means for obtaining services available at the venue area from one or more nodes associated with the venue area, wherein the means for obtaining the services available at the venue area from the one or more nodes comprises:
means for obtaining reduced level of services from the one or more nodes associated with the venue area based on a count of a number of violations made by the mobile device of the one or more location-based restrictions occurring during a particular period of time.

58. The apparatus of claim 57, wherein the means for obtaining the data representative of the one or more location-based restrictions comprises:
means for receiving by a trusted engine executing on the mobile device the data representative of the one or more location-based restrictions corresponding to the venue area in which the mobile device is determined to be located, wherein the trusted engine is configured to negotiate and to enforce, at least in part, the one or more location-based restrictions corresponding to the venue area.

59. The apparatus of claim 58, wherein the trusted engine is further configured to:
determine, at least in part, whether the mobile device complies with the one or more location-based restrictions corresponding to the venue area.

60. The apparatus of claim 57, wherein the means for obtaining the data representative of the one or more location-based restrictions comprises:
means for obtaining use policy comprising one or more of: requirements regarding physical entry into restricted regions in the venue area, or requirements regarding access of restricted content data.

61. The apparatus of claim 57, wherein the means for obtaining the reduced level of services comprises:
means for obtaining degraded services, caused through initiation of one or more enforcement operations by the venue server to modify the services available from the one or more nodes, in response to a determination that a pre-determined number of violations by the mobile device of the one or more location-based restrictions have occurred.

62. The apparatus of claim 61, wherein the one or more enforcement operations comprise one or more of: causing suspension or termination of at least one communication link between at least one of the one or more nodes associated with the venue area and the mobile device, causing restricted content destined to the mobile device to be discarded before it is transmitted to the mobile device, or sending a warning to the mobile device that a violation has occurred.

63. A non-transitory processor readable storage media programmed with a set of instructions executable on a processor that, when executed, cause operations comprising:
obtaining, by a mobile device, data representative of one or more location-based restrictions corresponding to a venue area in which the mobile device is determined to be located; and
obtaining, at the mobile device, services available at the venue area from one or more nodes associated with the venue area,
wherein obtaining, at the mobile device, the services available at the venue area from the one or more nodes comprises:
obtaining reduced level of services from the one or more nodes associated with the venue area based on a count of a number of violations made by the mobile device of the one or more location-based restrictions occurring during a particular period of time.

64. The processor readable media of claim 63, wherein obtaining the data representative of the one or more location-based restrictions comprises:
receiving by a trusted engine executing on the mobile device the data representative of the one or more location-based restrictions corresponding to the venue area in which the mobile device is determined to be located, wherein the trusted engine is configured to negotiate and to enforce, at least in part, the one or more location-based restrictions corresponding to the venue area.

65. The processor readable media of claim 64, wherein the trusted engine is further configured to:
determine, at least in part, whether the mobile device complies with the one or more location-based restrictions corresponding to the venue area.

66. The processor readable media of claim 63, wherein obtaining the data representative of the one or more location-based restrictions comprises:
obtaining use policy comprising one or more of: requirements regarding physical entry into restricted regions in the venue area, or requirements regarding access of restricted content data.

67. The processor readable media of claim 63, wherein obtaining, at the mobile device, the reduced level of services comprises:
obtaining degraded services, caused through initiation of one or more enforcement operations by the venue server to modify the services available from the one or more nodes, in response to a determination that a pre-determined number of violations by the mobile device of the one or more location-based restrictions have occurred.

68. The processor readable media of claim 67, wherein the one or more enforcement operations comprise one or more of: causing suspension or termination of at least one communication link between at least one of the one or more nodes associated with the venue area and the mobile device, causing restricted content destined to the mobile device to be discarded before it is transmitted to the mobile device, or sending a warning to the mobile device that a violation has occurred.

* * * * *